United States Patent Office 3,110,740
Patented Nov. 12, 1963

3,110,740
PROCESS FOR THE CHLORINATION OF ALLENE
Hendricus Gerardus Peer, Rijswijk Z.H., Netherlands, assignor to Nederlandse Organisatie voor Toegepast-Natuurwetenschappelijk Onderzoek ten behoeve van Nijverheid, Handel en Verkeer, The Hague, Netherlands, a corporation of Netherlands
No Drawing. Filed Feb. 13, 1961, Ser. No. 88,602
Claims priority, application Great Britain Feb. 18, 1960
4 Claims. (Cl. 260—654)

This invention relates to a process for the chlorination of allene ($CH_2=C=CH_2$) in inert solvents.

The term "inert solvent" as used herein means those solvents which under the reaction conditions, do not appreciably react either with the reactants or with the reaction products. Examples of such solvents are chloroform, methylene chloride, symm.-tetrachloro ethane and dimethyl formamide, and also toluene and para-xylene.

Surprisingly, not more than about 1 mol chlorine per mol of allene appears in the end-products under the reaction conditions described; it is also remarkable that no 1,2,2,3-tetrachloro propane is found in the reaction mixture.

Substantially two products are obtained, namely 2,3-dichloropropene-1 ($CH_2=CCl—CH_2Cl$) and propargyl chloride ($CH_2Cl—C\equiv CH$).

The invention may be illustrated, without any implied restriction thereto, by the following examples.

Example 1

Into a solution of 6550 ml. of gaseous allene in 350 grams of chloroform kept at a temperature of −30° C., chlorine gas is introduced in the dark and under a nitrogen atmosphere. The solution remains colourless until slightly more than 1 mol of chlorine per mol of allene has been added, after which the solution suddenly turns yellow; at this point the introduction of chlorine is stopped. A total of 7930 ml. of chlorine are introduced. The reaction mixture is brought to room temperature, whereby the solution becomes colourless, potassium carbonate is added in order to remove the hydrochloric acid formed and then the reaction mixture is subjected to fractional distillation.

The results are given in the following table.

| Boiling point fraction, °C. | Weight in grams | Composition as determined by infra-red analysis |
|---|---|---|
| 56.5–58 | 5.7 | 0.6 g. of propargyl chloride; 5.1 g. of chloroform. |
| 58–61.5 | 317 | 8.4 g. of propargyl chloride; 308.6 g. of chloroform. |
| 61–94 | 3 | Unknown. |
| 94 | 12 | 12 g. of 2,3-dichloro propene-1. |

A total yield of 38% of 2,3-dichloro propene-1 and 43% of propargyl chloride, both calculated on the initial amount of allene, is obtained.

At temperatures up to 30° C., essentially the same results are obtained although the yields of 2,3-dichloro propene-1 and propargyl chloride are somewhat lower viz. 28% and 30% respectively, calculated on the initial amount of allene.

Because propargyl chloride has a boiling point (56 to 57° C.) only slightly below that of chloroform (60 to 61° C.), it is advisable to use a solvent having a boiling point either below that of propargyl chloride or above that of 2,3-dichloro propene-1 for in such a case separation of the two compounds from the solvent can easily be done by fractional distillation and the reaction products can thus be obtained with a high degree of purity.

A solvent such as dioxane is not so suitable because its boiling point (102° C.) is scarcely higher than the boiling point of 2,3-dichloro propene-1.

Nevertheless it will be understood that the boiling point of a liquid depends on the pressure prevailing during boiling so that a solvent which is not very suitable at, say, normal pressures may be quite suitable when fractionating is effected at an elevated or a reduced pressure.

Example 2

The Example 1 is repeated but instead of chloroform as the solvent, methylene chloride ($CH_2Cl_2$; boiling point 40° C.) is used. Yields are obtained of about 20% and 30% respectively of 2,3-dichloro propene-1 and propargyl chloride, calculated on the initial amount of allene.

Example 3

The Example 1 is repeated but instead of chloroform as the solvent, symm.-tetrachloro ethane ($CHCl_2—CHCl_2$; boiling point 146° C.) is used. Yields are obtained of about 25 and 35% respectively of 2,3-dichloro propene-1 and propargyl chloride, calculated on the initial amount of allene.

Example 4

Into a solution of 7030 ml. of gaseous allene in 250 ml. of dimethyl formamide (boiling point 153° C.) kept at a temperature of −30° C., 6555 ml. of gaseous chlorine is introduced in the dark under a nitrogen atmosphere. The reaction mixture is brought to room temperature and the reaction mixture is subjected to fractional distillation. A total yield of 6 g. of propargyl chloride and 8 g. of 2,3-dichloro propene-1 is obtained which is about 28% and 25% respectively of propargyl chloride and 2,3-dichloro propene-1, calculated on the amount of chlorine used in the reaction. It should be noted that the amount of chlorine used is slightly less than the equivalent amount.

Separation of the propargyl chloride from the 2,3-dichloro propene-1 presents no difficulties e.g. in view of their boiling points being quite different.

All experiments recorded in the examples are on a laboratory scale, which means that slight losses during the purification step have a relatively large effect upon the yield. It stands to reason that the yields may be substantially improved if the process is carried out in a large scale apparatus.

Separation of the reaction products from a water-miscible inert solvent is also possible by adding to the reaction mixture a substance such as water which precipitates the reaction products. Other methods of recovering these two substances from the reaction mixture and of separating the two products can be easily devised by anyone skilled in the art.

The reaction scheme is probably as follows:

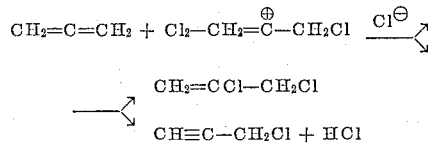

2,3-dichloro propene-1 and especially propargyl chloride have striking nematocidal properties.

Although the solvent should be inert under the reaction conditions this requirement does not always mean that the solvent has no influence whatsoever on the course of the reaction.

For instance, such solvents as n-decane, dibutyl ether, carbon disulphide and carbon tetrachloride may be said to be inert but chlorination of allene dissolved in these solvents is slow and the yields of 2,3-dichloro propene-1 and propargyl chloride are in the order of about half of the yields given in the previous examples. It should be noted that the polarity of the solvent seems to be of some importance although the polarity of e.g. chloroform, which, apart from its boiling point not being ideal in the fractionating step, is a suitable solvent, is not greatly different from the polarity of e.g. carbon disulphide. Another example of an inert solvent is toluene.

Example 5

Example 1 is repeated but instead of using chloroform as the solvent a solution of 6575 ml. of gaseous allene in 250 grams of pure toluene is used and at a temperature of —30° C. 6565 ml. of chlorine are introduced in the dark and under a nitrogen atmosphere. After working up the reaction mixture including fractional distillation the reaction product is substantially only propargyl chloride (yield about 40% calculated on initial allene); about 5% 2,3-dichloro propene-1 seems to be formed.

Replacing in this example toluene as the solvent by para-xylene and chlorinating at 10° C. gives substantially the same results. Probably the aromatic character of both solvents plays a role, not fully understood yet, in the decrease of the yield of 2,3-dichloro propene-1.

From the examples it will be seen that even if the solvent is, according to the invention, inert, it exerts an influence on the course of the reaction although the general picture is always the same.

Glacial acetic acid will serve as an example of a polar but not inert solvent.

Example 6

In a three-necked flask provided with a mechanical stirrer, a thermometer and two gas inlets, 250 ml. of glacial acetic acid are kept maintained at a temperature of 15 to 17° C. by means of a water bath. Allene and chlorine are simultaneously but separately introduced while excluding light, both at a rate of 70 ml. per minute. The temperature of the reaction mixture is allowed to rise from 17 to 22° C. After introducing 7225 ml. of chlorine and 7225 ml. of allene, the colourless clear reaction mixture is poured out into 1 litre of water and is then neutralised with 2240 ml. of an aqueous solution of 2 N sodium hydroxide. After extraction with ether and drying the ethereal extract over anhydrous $Na_2SO_4$ the extract is distilled. After removal of the ether 18.7 grams of residue are obtained from which 12 grams of pure 2-chloro 3-acetoxy propene-1 (boiling point 139 to 141° C.; $n_D^{20}=1.4378$) can be isolated by fractional distillation. The chemical composition of the product is

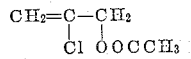

as established by comparison with an authentic sample.

It is believed that the mechanism of the reactions involved may be stated as follows.

The chemical structure of allene is $$(1)CH_2=(2)C=(3)CH_2$$

in which the figures between brackets denote the numbering of the carbon atoms.

Chlorination takes place at one of the two double bonds, say at the double bond between the carbon atoms (2) and (3). This addition of chlorine at said double bond probably takes place in two steps.

First a primary addition of positive $Cl^+$-ions takes place. This reaction may schematically be represented as follows:

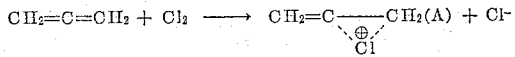

The structure (A) may be called a chloronium ion. This structure seeks to be stabilized.

If the solvent has no (substantial) nucleophilic character, which holds true for example for the solvents mentioned in Examples 1, 2, 3, 4, and 5, stabilization takes place by incorporation of a negative chlorine $Cl^-$-ion:

$$(A)+Cl^-\rightarrow CH_2=CCl—CH_2Cl$$

thus leading to the formation of 2,3-dichloro propene-1. But, probably due to the rather weak nucleophilic activity of the negative chlorine ions, there is a simultaneous stabilization of (A) by its splitting off a proton:

$$(A)—H^+\rightarrow HC\equiv C—CH_2Cl(+HCl)$$

thus leading to the formation of propargyl chloride.

If, on the contrary, the solvent, such as glacial acetic acid, has a marked nucleophilic activity yielding e.g. $CH_3COO^-$ ions, these nucleophilic ions will take over the stabilizing action of the negative chlorine $Cl^-$-ions:

$$(A)+CH_3COO^-\rightarrow CH_2=CCl—CH_2OOCCH_3$$

leading to the formation of, e.g., 2-chloro 3-acetoxy propene-1.

What is claimed is:
1. A process for the production of a mixture containing 2,3-dichloro-propene-1 and propargyl chloride as the predominant chlorinated products which consists in the steps of reacting chlorine with about equimolar amounts of a solution of allene in an inert liquid solvent and recovering said 2,3-dichloro-propene-1 and propargyl chloride.
2. The process of claim 1 wherein said inert liquid solvent is a polar liquid.
3. The process of claim 1 wherein said inert liquid solvent has a boiling point substantially different from the boiling points of propargyl chloride and 2,3-dichloro-propene-1.
4. The process of claim 1 wherein said inert liquid solvent has a nucleophilic activity markedly less than that of the negative chlorine ion with respect to the chloronium ion formed in the primary addition of a positive chlorine ion to one of the double bonds of allene.

References Cited in the file of this patent
UNITED STATES PATENTS 2,973,393     Monroe                Feb. 28, 1961
3,009,967     Monroe                Nov. 21, 1961